(12) United States Patent
Ogura et al.

(10) Patent No.: US 8,746,896 B2
(45) Date of Patent: Jun. 10, 2014

(54) LIGHT SOURCE UNIT AND PROJECTOR

(75) Inventors: Naotsugu Ogura, Hamura (JP); Hideki Nakamura, Hamura (JP); Takeshi Miyazaki, Fussa (JP); Osamu Umamine, Fussa (JP); Hiroki Masuda, Fussa (JP); Yasuyuki Kawakami, Abiko (JP)

(73) Assignees: Casio Computer Co., Ltd., Tokyo (JP); Stanley Electric Co., Ltd., Tokyo (JP)

( * ) Notice: Subject to any disclaimer, the term of this patent is extended or adjusted under 35 U.S.C. 154(b) by 228 days.

(21) Appl. No.: 13/237,048

(22) Filed: Sep. 20, 2011

(65) Prior Publication Data

US 2012/0075591 A1    Mar. 29, 2012

(30) Foreign Application Priority Data

Sep. 24, 2010 (JP) ................... 2010-213740

(51) Int. Cl.
*G03B 21/26* (2006.01)
*G01T 1/00* (2006.01)

(52) U.S. Cl.
USPC .......................................... 353/94; 250/486.1

(58) Field of Classification Search
USPC .......... 250/483.1, 484.2, 484.3, 484.4, 486.1, 250/487.1, 488.1; 353/22, 24, 48, 84, 85, 353/89, 100, 101, 119, 94; 356/418; 359/619
See application file for complete search history.

(56) References Cited

U.S. PATENT DOCUMENTS

| | | | |
|---|---|---|---|
| 8,354,790 B2 * | 1/2013 | Iwanaga | 313/506 |
| 8,523,924 B2 | 9/2013 | Meyer et al. | |

FOREIGN PATENT DOCUMENTS

| | | |
|---|---|---|
| CN | 101460778 A | 6/2009 |
| CN | 101592308 A | 12/2009 |
| JP | 11-084271 A | 3/1999 |
| JP | 2001-076613 A | 3/2001 |
| JP | 2004-341105 A | 12/2004 |
| JP | 2005-268323 A | 9/2005 |
| JP | 2006-189700 A | 7/2006 |
| JP | 2007-200782 A | 8/2007 |
| JP | 2007-273972 A | 10/2007 |
| JP | 2009-277516 A | 11/2009 |
| JP | 2010-181529 A | 8/2010 |
| JP | 2011-257600 A | 12/2011 |

OTHER PUBLICATIONS

Korean Office Action dated Oct. 24, 2012 (and English translation thereof) in counterpart Korean Application No. 10-2011-0097148.
Chinese Office Action dated Nov. 21, 2013 (and English translation thereof) in counterpart Chinese Application No. 201110348491.5.
Japanese Office Action dated Feb. 27, 2014 (and English translation thereof) in counterpart Japanese Application No. 2010-213740.

* cited by examiner

*Primary Examiner* — Georgia Y Epps
*Assistant Examiner* — Don Williams
(74) *Attorney, Agent, or Firm* — Holtz Holtz Goodman & Chick PC

(57) ABSTRACT

A light source unit includes an excitation light source and a luminescent wheel on which luminescent light emitting areas including, on a reflecting surface, red and green luminescent materials which respectively emit light of red and green wavelength band, when receiving excitation light, and a diffuse transmission area which diffuses and transmits excitation light, are aligned end to end in a circumferential direction. An excitation light incident surface of a luminescent material layer of the luminescent wheel has a surface with a plurality of projecting bodies. Regular quadrangular pyramids are arranged thereon in a matrix with outer boundaries of bottom portions of adjacent regular quadrangular pyramids contacting each other. The pyramids rise at a rising angle of at least 30°, and a length of one side of an outer boundary of the bottom portion of the pyramid is between 10 and 100 μm.

20 Claims, 12 Drawing Sheets

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2010-213740 filed on Sep. 24, 2010, the entire disclosure of which, including the description, claims, drawings and abstract thereof, is to be incorporated herein by reference.

BACKGROUND OF THE INVENTION

1. Field of the Invention

The present invention relates to a light source unit having a luminescent plate and a projector including this light source unit.

2. Description of the Related Art

In these days, data projectors are used on many occasions as image projection apparatuses which project images including images of screens and video images of personal computers, as well as images based on image data which is stored in memory cards on to a screen. These projectors are such that pencils of light which are emitted from a light source are collected to a display device such as a micromirror device called DMD (Digital Micromirror Device) or a liquid crystal plate so as to form an image on a screen by projecting light emitted from the display device onto the screen via a projection side optical system.

Conventionally, the mainstream of these projectors has been those which use a high-intensity discharge lamp as a light source. However, in recent years, there have been made many developments and proposals on projectors which use, as a light emitting element of a light source, a light emitting diode (LED), a laser emitter, a device utilizing organic EL technology or a luminescent material. For example, Japanese Patent No. 3415403 proposes, as a light source of a projector, three types of laser light sources which emit individually light of red, green and blue wavelength bands. In addition, Japanese Unexamined Patent Publication No. 2004-341105 (JP-A-2004-341105) proposes a light source unit including an excitation light source which emits ultraviolet light and a luminescent wheel which is a rotary luminescent plate on which luminescent material layers emitting individually light of red, green and blue wavelength bands are laid end to end in a circumferential direction.

In the light source unit proposed in Japanese Patent No. 3415403, including the three types of laser light sources requires a driving circuit, leading to a problem that the light source encounters difficulty in being incorporated in a projector which tends to be smaller in size and thinner in thickness so as to meet the current market demands. In addition, in order to realize an increase in luminance in a projector like the one described above which includes those three types of laser light sources, the respective outputs of the laser light sources need to be increased. When the outputs are increased, the respective calorific powers of the light sources are increased, and therefore, a cooling mechanism needs to be enlarged in size, leading to a problem that the light source encounters difficulty in being incorporated in a projector which tends to be smaller in size and thinner in thickness so as to meet the current market demands. Further, although it is considered that the laser light sources are increased in size in order to realize such an increase in luminance, when the laser light sources are increased in size, the following problems have to be faced. That is, the enlarged light source encounters difficulty in being incorporated in a projector which tends to be smaller in size and thinner in thickness so as to meet the current market demands, and the utilization efficiency of light of the light source is reduced due to an increased difference between the Etendue of a light source side optical system and the Etendue of a projection side optical system which results from the increased light emitting area.

On the other hand, in the light source unit proposed in JP-A-2004-341105, an increase in luminance can be realized with a difference between the Etendue of a light source side optical system and the Etendue of a projection side optical system kept suppressed to a low level by increasing the output of the excitation light source. However, when excitation light is shone normal to a flat plane of the luminescent wheel from a front side thereof, part of light incident on the luminescent material layers passes through the luminescent material layers and is then reflected on a reflecting surface of the luminescent wheel to thereby be emitted from an incident surface of the excitation light towards the excitation light source without exciting the luminescent materials, which happens occasionally, leading to a problem that the utilization efficiency of excitation light is reduced. Further, since light emitted from the luminescent materials scatters in every direction, part of luminescent light is wasted by being attenuated in the luminescent material layers, leading to a problem that the utilization efficiency of luminescent light is reduced.

SUMMARY OF THE INVENTION

The invention has been made in view of the problems inherent in the related art, and an object thereof is to provide a light source unit which includes a luminescent plate which can increase the utilization efficiency of excitation light and luminescent light by laying a luminescent material layer on a reflecting surface and forming irregularities on an excitation light incident surface of the luminescent material layer and a light source which shines excitation light on to the luminescent plate, and a projector which includes the same light source unit to thereby enable the projection of a highly luminous image.

According to an aspect of the invention, there is provided a light source unit including: a luminescent plate which includes a luminescent material layer for emitting light of a predetermined wavelength band when excitation light is incident thereon and which emits luminescent light from an excitation light incident surface of the luminescent material layer; and an excitation light source which shines the excitation light on to the luminescent plate, wherein the excitation light incident surface of the luminescent material layer has a surface construction in which a plurality of irregularities are formed thereon.

In addition, another aspect of the invention, there is provided a projector including: the light source unit described above; a display device; a light source side optical system which emits light emitted from the light source unit towards the display device; a projection side optical system which emits projection light produced at the display device towards a screen; and a projector control unit for controlling the light source unit and the display device.

According to the aspects of the invention, there can be provided the light source unit including the luminescent plate which includes the luminescent material layer laid on the reflecting surface and which can increase the utilization efficiency of excitation light and luminescent light by forming the irregularities on the excitation light incident surface of the luminescent material layer and the light source which shines excitation light onto the luminescent plate, and the projector which can project the highly luminous image by including the light source described above.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings.

DETAILED DESCRIPTION OF THE PREFERRED EMBODIMENT

Hereinafter, a preferred mode for carrying out the invention will be described by use of the accompanying drawings. Although various limitations which are technically preferable for carrying out the invention are imposed on embodiments which will be described below, the scope of the invention is not limited in any way to the following description and illustrated examples.

Figure 1:
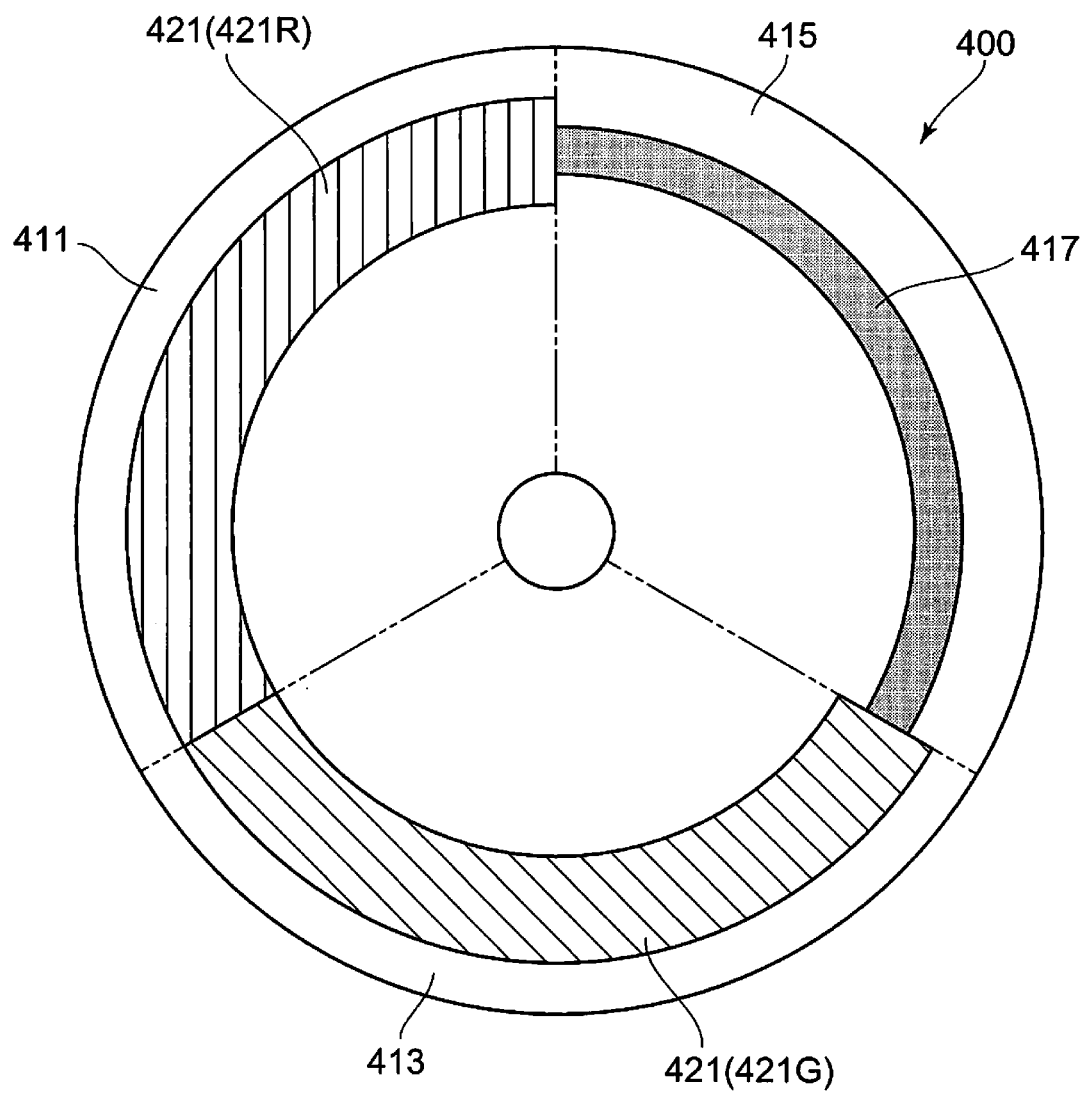
FIG. 1 is a front exemplary drawing of a luminescent plate according to an embodiment of the invention.
Figure 2:
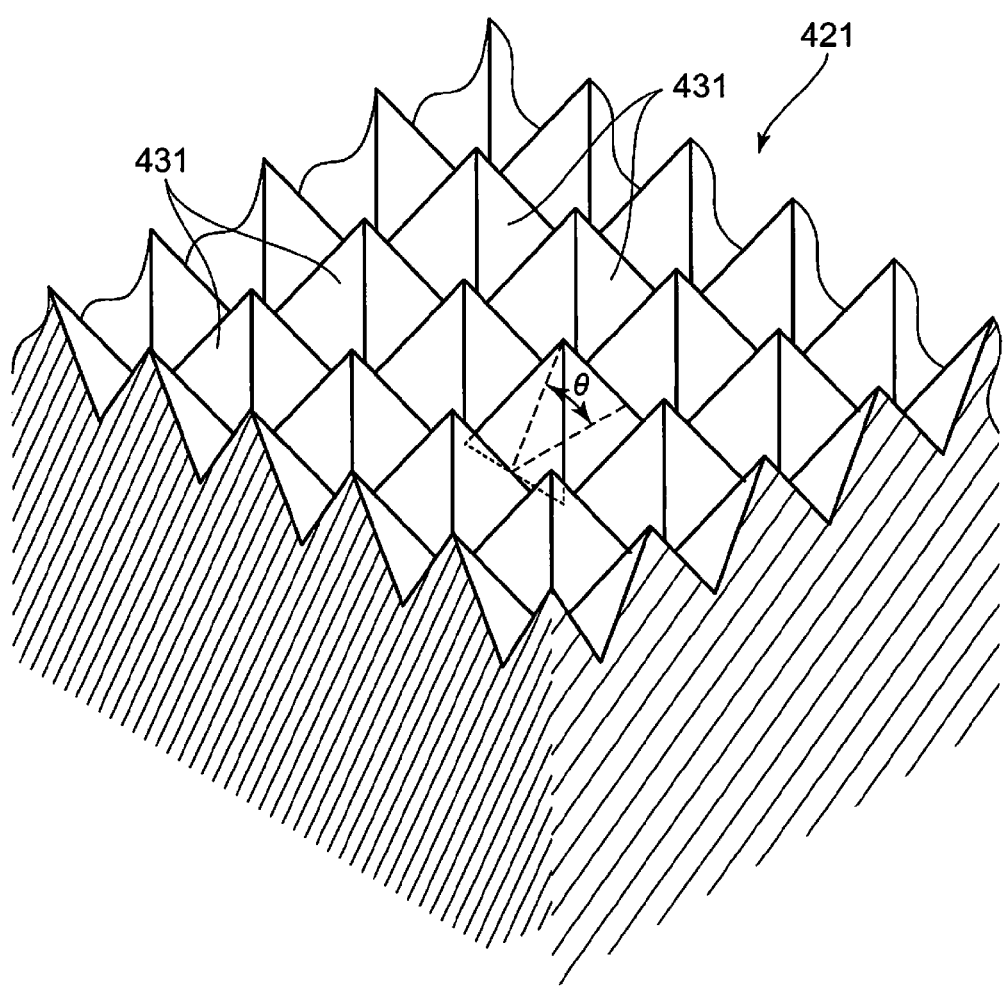
FIG. 2 is an exemplary drawing showing a surface construction of a luminescent material layer of the luminescent plate.

Hereinafter, an embodiment of the embodiment will be described based on the drawings. FIG. 1 is an exemplary front view of a luminescent plate according to this embodiment, and FIG. 2 is an exemplary drawing showing a surface construction of a luminescent material layer of the luminescent plate. The luminescent plate 400 of this embodiment is, as is shown in the FIG. 1, a circular disk-shaped base on which a red luminescent light emitting area 411, a green luminescent light emitting area 413 and a diffuse transmission area 415 are laid end to end in a circumferential direction; the red luminescent light emitting area 411 emits luminescent light of red wavelength band when it receives light emitted from an excitation light source as excitation light; the green luminescent light emitting area 413 emits luminescent light of green wavelength band when it receives light emitted from the excitation light source as excitation light; and the diffuse transmission area 415 which diffuses and transmits light emitted from the excitation light source.

Front surfaces of the red luminescent light emitting area 411 and the green luminescent light emitting area 413 of the luminescent plate 400 are made into a reflecting surface through silver deposition or the like. In addition, a transparent protective film of magnesium fluoride or the like is formed on a front surface of the reflecting surface through spattering. Then, an arc-shaped luminescent material layer 421 (a red luminescent material layer 421R and a green luminescent material layer 421G) of a predetermined width is laid on the transparent protective film. The luminescent material layer 421 is made up of a binder of a silicone resin or like with a high-thermal resistance and a high transparency and a luminescent material which is uniformly dispersed in the binder. In addition, an arc-shaped opening of a predetermined width is formed in the diffuse transmission area 415 of the luminescent plate 400, and a diffuse transmission plate 417 is set in this opening.

In the conventional luminescent plate, when the surface of the luminescent material layer is flat, for example, in excitation light which is incident on the luminescent material layer, a large quantity of excitation light is reflected on the reflecting surface of the luminescent plate and the surface of the luminescent material without exciting the luminescent material layer so as to be emitted to the outside of the luminescent plate, leading to the problem that the utilization efficiency of excitation light is low. In addition, in the pencils of light emitted from the luminescent material, a large quantity of light repeats reflections within the luminescent material layer to thereby be attenuated without being extracted from the incident surface of excitation light, leading to the problem that the utilization efficiency of luminescent light is low. Consequently, in order to increase the output from the luminescent plate, the utilization efficiency of excitation light and luminescent light needs to be increased.

Then, as is shown in FIG. 2, the luminescent material layer 421 of this embodiment includes a surface construction in which a plurality of irregularities are formed on an incident surface of excitation light. In this surface construction, a plurality of regular quadrangular pyramids 431 are arranged into a matrix and so that outer boundaries of bottom portions of adjacent regular quadrangular pyramids 431 are in contact with each other. In addition, these regular quadrangular pyramids 431 are formed so as to rise from the base at a rising angle θ of not less than 30 degrees. Further, a length of a side of the outer boundary of the bottom portion of the regular quadrangular pyramid 431 is set to be in the range of 10 to 100 μm. The reason that the length of the side is set to be in such a range is that in general, the width of the luminescent material layer 421 on the luminescent plate 400 is approximately in the range of 2 to 5 mm and that tens to hundreds of regular quadrangular pyramids 431 can be arranged in the width of the luminescent material layer 421. Note that a surface construction like this is formed by pressing a mold against a luminescent material layer 421 when the luminescent material layer 421 is laid on the luminescent plate 400.

When an incident surface of the luminescent material layer 421 on which excitation light is incident is formed so as to have the surface construction in which the plurality of regular quadrangular pyramids 431 are arranged in the way described above, pencils of light shone on to the luminescent material layer 421 are refracted on the surface of the luminescent material layer 421 and then enters an interior of the luminescent material layer 421. As this occurs, the luminescent material layer 421 has the surface construction in which the regular quadrangular pyramids 431 are arranged on the excitation light incident surface in the way described above, and therefore, even though excitation light is shone on to the luminescent material layer 421 at the same angle, the refraction angle of excitation light changes depending on where excitation light is shone to the regular quadrangular pyramids 431, whereby excitation light is diffused in various directions within the luminescent material layer 421. As a result of this, since excitation light is allowed to spread over a wide range in the luminescent material layer 421, excitation light that is shone on to the luminescent material within the luminescent material layer 421 is increased, thereby making it possible to increase the utilization efficiency of excitation light. In addition, although luminescent light produced by the luminescent material when it receives excitation light so shone is emitted in every direction, the excitation light incident surface of the luminescent material layer 421 has the various angles, and therefore, pencils of light which are once reflected by the excitation light incident surface so as to be shone on to the reflecting surface of the luminescent plate 400 are also shone on to the excitation light incident surface which has the different angles with high probability next time the pencils of light are shone on to the excitation light incident surface. Then, the excitation light shone again on to the excitation light incident surface is eventually emitted to the outside from the excitation light incident surface, thus making it possible to reduce the amount of luminescent light which is attenuated to be extinct within the luminescent material layer 421, whereby the utilization of luminescent light can be increased.

Figure 3:
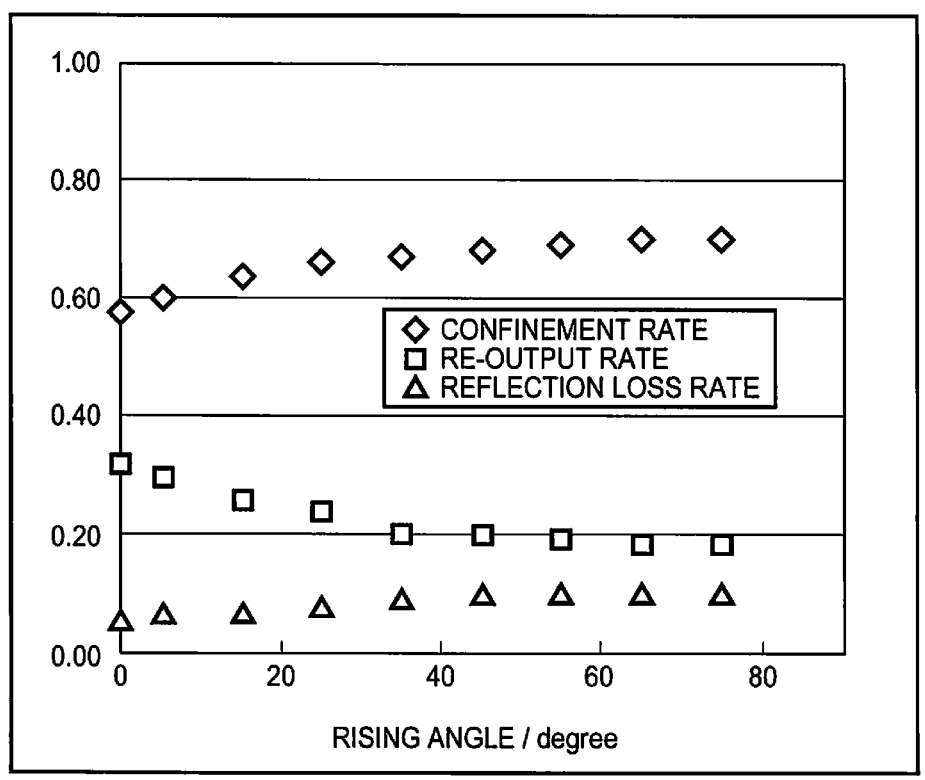
FIG. 3 is a graph showing a relationship between a rising angle of a regular quadrangular pyramid which makes up the surface construction with respect to a flat plane and a confinement rate, re-output rate and reflection loss rate of excitation light when excitation light is shone to the luminescent material layer from a front side of the luminescent material layer.
Figure 4:
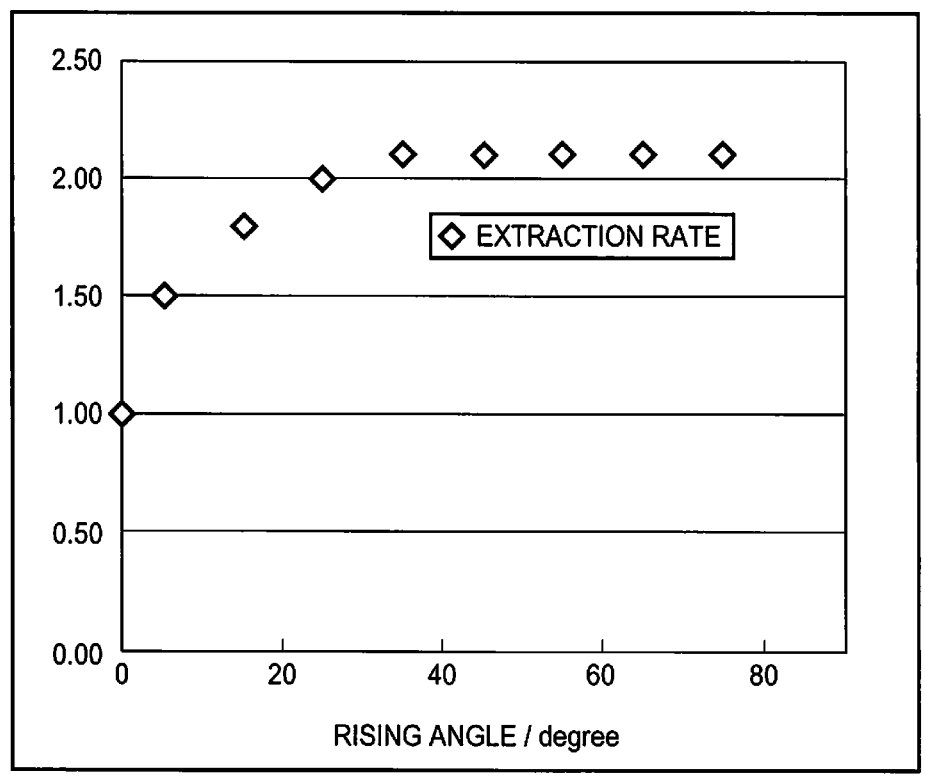
FIG. 4 is a graph showing a relationship between the rising angle of the regular quadrangular pyramid which makes up the surface construction with respect to the flat plane and an extraction rate of luminescent light emitted from the luminescent material through luminescence.
Figure 5:
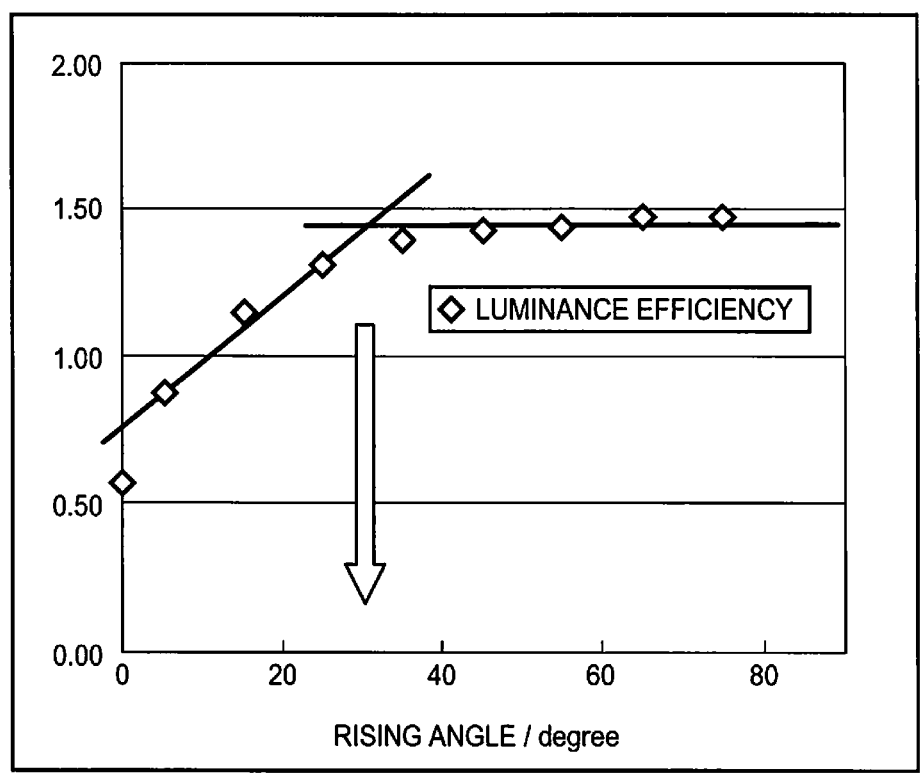
FIG. 5 is a graph showing a relationship between the rising angle of the regular quadrangular pyramid which makes up the surface construction with respect to the flat plane and a luminance efficiency of the luminescent plate.

Next, an effect produced by forming minute irregularities on the excitation light incident surface of the luminescent material layer 421 will be described by use of graphs depicting the results of simulations made based on the ray tracing method. FIG. 3 is a graph showing a relationship between the rising angle θ of the regular quadrangular pyramids 431 and a confinement rate, re-output rate and reflection loss rate of excitation light when it is shone to the luminescent material layer 421 from a front side of the luminescent material layer 421 of the luminescent plate 400. In addition, FIG. 4 is a graph showing a relationship between the rising angle θ of the regular quadrangular pyramids 431 and an extraction rate of luminescent light. Further, FIG. 5 is a graph showing a relationship between the rising angle θ of the regular quadrangular pyramids 431 and a luminous efficiency of the luminescent material.

The confinement rate discussed in FIG. 3 means a ratio of excitation light which is incident on the luminescent material within the luminescent material layer 421 so as to excite the luminescent material to excitation light shone on to the luminescent material layer 421, that is, a ratio of the excitation light which is used effectively to the whole of excitation light shone on to the luminescent material layer 421. The re-output rate means a ratio of excitation light which enters the interior of the luminescent material layer 421 in vain to be reflected on the surface of the luminescent material or the reflecting surface of the luminescent plate 400 so as to be emitted again to the outside as it is. The reflection loss rate means a ratio of excitation light which is shone in vain on to the luminescent material layer 421 to be reflected by the surface of the luminescent material layer 421 so as not to be allowed to enter the interior of the luminescent material layer 421. In FIG. 3, an axis of abscissas represents the rising angle θ, and an axis of ordinates represents a rate of excitation light to the whole of excitation light shone on to the luminescent material layer 421, which is referred to as 1.00. Namely, the addition of confinement rate, re-output rate and reflection loss rate equals 1.00.

As is shown in FIG. 3, as the rising angle θ increases, the confinement rate and the reflection loss rate also increase, while the re-output rate decreases. Then, it is seen that the confinement rate stops increasing to stay substantially at the same level somewhere the rising angle θ exceeds 30 degrees. Although the reflection loss rate also increases as the rising angle θ increases, the re-output rate decreases not less than the increase of the rising angle θ, and therefore, it is seen that the utilization efficiency of excitation light shone on to the luminescent material layer 421 increases drastically until the rising angle θ exceeds 30 degrees.

In FIG. 4, the extraction rate means a ratio of luminescent light which is emitted as effective light from the excitation light incident surface of the luminescent material layer 421 to the outside to luminescent light which is emitted from the luminescent material. In addition, in FIG. 4, an axis of abscissas represents the rising angle θ, and an axis of ordinates means a ratio of luminescent light that can be extracted based on an extraction rate resulting when no irregularities are formed on the excitation light incident surface of the luminescent material layer 421, which is referred to as 1.00. As is shown in FIG. 4, it is seen that the extraction rate increases drastically until the rising angle θ approaches near 30 degrees and stops increasing to stay substantially at the same level somewhere the rising angle θ exceeds 30 degrees. Namely, it is seen that the extraction rate can be increased by setting the rising angle θ to be not less than 30 degrees.

In FIG. 5, the luminous efficiency is such as to result from a multiplication of the confinement rate shown in FIG. 3 by the extraction rate shown in FIG. 4. Namely, as the luminous efficiency increases, the utilization efficiency of excitation light that enters the interior of the luminescent material layer 421 and the utilization efficiency of luminescent light also increase, thereby making it possible to realize an increase in the quantity of luminescent light. As is shown in FIG. 5, the luminous efficiency increases drastically in the range where the rising angle θ increases from 0 degree to near 30 degrees and stops increasing to stay substantially at the same level somewhere the rising angle θ exceeds 30 degrees. Consequently, the quantity of luminescent light can be increased largely by setting the rising angle θ to be not less than 30 degrees. It is seen in FIG. 5 that a quantity of luminescent light can be obtained which is more by approximately 1.5 times than the quantity of luminescent light obtained when no irregularities are formed on the excitation light incident surface of the luminescent material layer 421.

In this way, the luminous efficiency can be increased by forming the minute irregularities on the excitation light incident surface of the luminescent material layer 421. In particular, the luminous efficiency can be increased by setting the rising angle θ to be not less than 30 degrees. Consequently, as has been described above, by forming irregularities on the excitation light incident surface of the luminescent material layer 421 by forming the plurality of regular quadrangular pyramids 431 thereon and setting the rising angle θ to be not less than 30 degrees, the utilization efficiency of excitation light and luminescent light can be increased, thereby making it possible to realize an increase in the quantities of excitation light and luminescent light.

Next, a difference in luminous intensity between when the luminous plate 400 is used and when the conventional luminous plate is used in which the surface of the luminescent material layer is flat will be described based on the results of experiments.

As an excitation light source, a blue semiconductor laser light source was used whose luminous wavelength peak was 445 nm and output was 10 W.

A red luminescent material was produced by formulating materials such as strontium nitride, calcium nitride, aluminum nitride, silicon nitride, and europium oxide in a molar ratio of Sr:Ca:Al:Si:Eu=0.75:0.25:1.0:1.0:0.15 within an atmosphere of nitrogen and mixing them in a planetary ball mill. The mixed materials were put in a container of boron nitride and were calcined at 190 degrees centigrade in a nitrogen atmosphere under nine atmospheric pressures for four hours.

A green luminescent material was produced by formulating materials such as yttrium oxide, aluminum oxide, gallium oxide, cerium oxide in a molar ratio of Y:Al:Ga:Ce=2.98:3:2:0.02. Further, 50 mole percents barium fluoride was formulated in the materials for the green luminescent material as a flux which promotes further the growth of crystal. Then, the materials and ethanol were put in a container of polyethylene and were mixed at 200 rpm for five hours. The mixed materials were filtered and dried, and were then put in a container of aluminum to be calcined at 1500 degrees centigrade in a 4% hydrogen reducing atmosphere for four hours. Further, the calcined materials were stirred in a 2N nitrate solution for one hour, were then rinsed with pure water and were dried.

A luminescent plate was prepared by coating a mirror-finished copper disk with titanium and chrome and thereafter vacuum depositing silver thereon. 80 wt % green luminescent material was mixed with a silicone resin, and 30 wt % red luminescent material was mixed with a silicone resin. Then, the resulting green and red luminescent materials were coated on the copper disk to a film thickness of about 200 µm and were set at 150 degrees centigrade for four hours with a mold pressed thereagainst which corresponded to regular quadrangular pyramids in which a length of one side of an outer boundary of a bottom portion was 50 µm and a rising angle was 45 degrees.

A comparison example having the same configuration of the luminescent plate described just above was formed by setting a luminescent material mixed silicone resin after having heated it at 150 degrees centigrade for four hours with no mold pressed against a luminescent material layer.

The luminescent plate 400 which was prepared in the way described above was disposed on an optical axis of the excitation light source and rotated at high speeds by a motor for measurement of a luminous intensity. The luminous intensity of the luminescent plate 400 became larger 1.1 to 1.2 times than the luminous intensity of the comparison example. Consequently, it has been obvious that the luminous efficiency can be increased by forming irregularities on the surface of the luminescent material layer 421.

Figure 6:
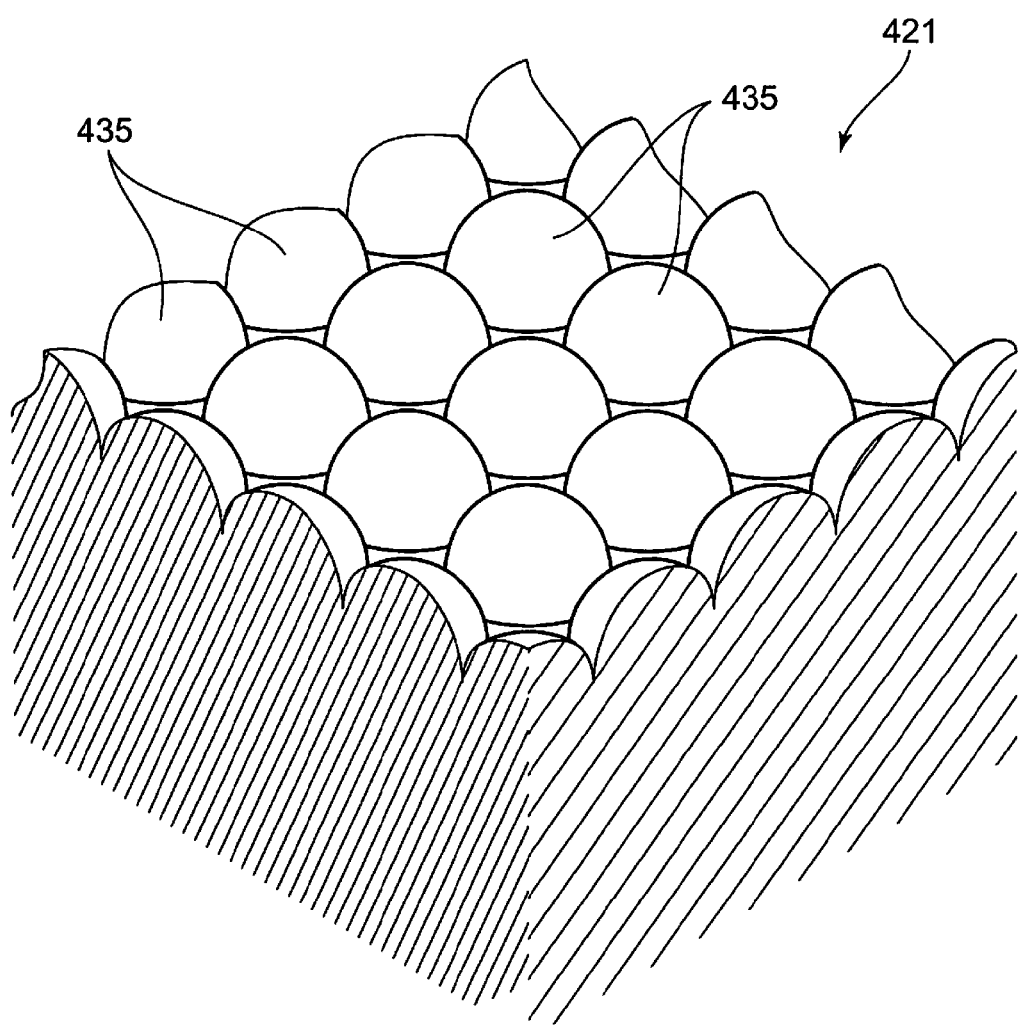
FIG. 6 is an exemplary drawing showing another surface construction for the luminescent material layer of the luminescent plate.

In the embodiment, while the excitation light incident surface of the luminescent material layer 421 has the surface construction in which the plurality of regular quadrangular pyramids 431 are arranged into a matrix and the adjacent quadrangular pyramids 431 are in contact with each other, the invention is not limited to this configuration. For example, as is shown in FIG. 6, a surface construction can be adopted in which a plurality of spherical bodies 435 having a rising angle θ of not less than 30 degrees are arranged uniformly on a flat surface. Even when this construction is used in which the spherical bodies 435 are used in place of the regular quadrangular pyramids 431, the utilization efficiency of excitation light and luminescent light can be increased, thereby making it possible to increase the quantities of excitation light and luminescent light. It is preferable that the size of the spherical body 435 is such that a length of one side of a square which touches internally a circular bottom portion is in the range of 10 to 100 µm. Namely, it is preferable that an overall length (circumference) of an outer circumference of the circular bottom portion of the spherical body 435 is in the range of 44 to 440 µm.

Figure 7:
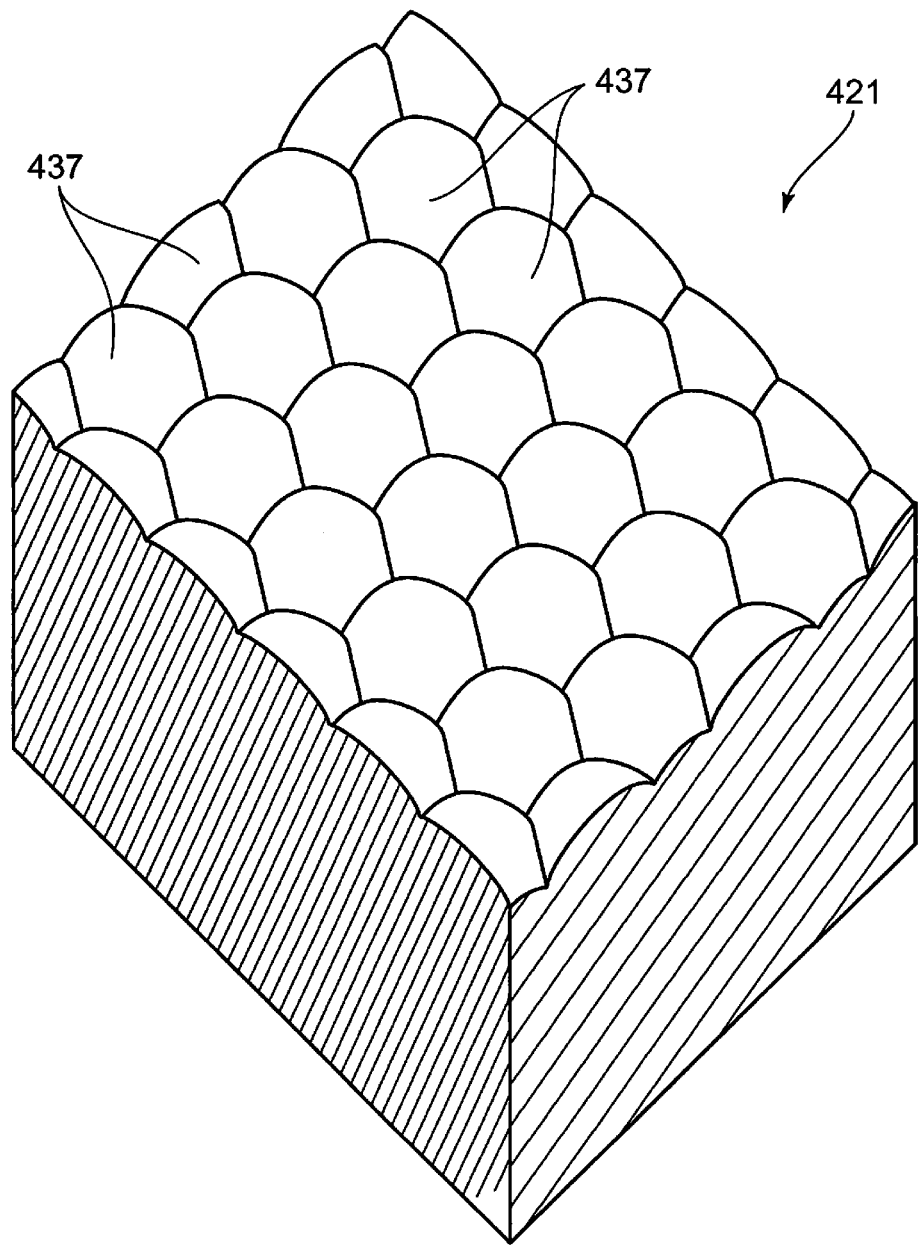
FIG. 7 is an exemplary drawing showing a further surface construction for the luminescent material layer of the luminescent plate.

In addition, as is shown in FIG. 7, a surface construction may also be adopted in which substantially spherical structures 437 which are each formed by forming a spherical surface at an upper end face of a shape formed by cutting part of a spherical body to have a hexagonal bottom surface or a hexagonal prism are uniformly disposed so that adjacent substantially spherical structures 437 are in contact with each other at sides of hexagonal portions thereof. Even when irregularities are formed on the excitation light incident surface with these substantially spherical structures 437, a rising angle of the spherical portion or cut plane is preferably set to be not less than 30 degrees, and a length of one side of the bottom surface is preferably in the range of 10 to 100 µm. Then, in a luminescent material layer 421 which includes the surface construction in which the substantially spherical structures 437 are arranged, a flat surface portion on the surface of the luminescent material layer 421 can be reduced, compared with the surface construction shown in FIG. 6 in which the spherical bodies 435 are arranged. Therefore, the utilization efficiency of excitation light and luminescent light can be increased further. In addition, a surface construction may also be adopted in which part of the spherical body is cut so as to have a square bottom portion. As this occurs, a length of one side of the square bottom portion is preferably in the range of 10 to 100 µm.

Further, as a surface construction for the excitation light incident surface of the luminescent material layer 421, a surface construction can also be adopted in which a plurality of aspheric bodies whose rising angle θ is not less than 30 degrees are uniformly arranged on a flat surface. Here, the aspheric body means a shape formed by a curved surface which is not spherical or flat (for example, a surface shape of an aspherical lens) (for example, aspherical lens). Even when the surface construction is adopted in which the surface of the luminescent material layer is covered with the plurality of aspheric bodies, the utilization efficiency of excitation light and luminescent light can be increased, thereby making it possible to increase the quantities of excitation light and luminescent light. In addition, a surface construction may also be adopted in which part of the aspheric body is cut to have a hexagonal or square bottom portion. As this occurs, a length of one side of the square or hexagon which makes up the bottom portion is preferably in the range of 10 to 100 µm.

In this way, the luminescent plate 400 of this embodiment is characterized in that the excitation light incident surface of the luminescent material layer 421 has the surface construction in which irregularities are formed thereon by arranging the plurality of projecting bodies on the flat surface. Hence, any surface construction may be adopted, provided that projecting bodies whose sectional area decreases from a bottom surface to an apex are arranged at equal intervals on the flat surface and so that at least parts of adjacent projecting bodies are in contact with each other. It is preferable that an apex portion of the projecting body is a sharp shape. In addition, even in the event that irregularities are formed by any types of projecting bodies, the rising angle is preferably set to be not less than 30 degrees. Further, it is preferable that an overall length of an outer boundary of the bottom portion of the projecting body is such that when a regular triangular pyramid is used as a projecting body, one side of a regular triangular bottom portion is 10 µm, at a minimum and is such that when a circular cone is used as a projecting body, one side of a hexagon which touches internally a circular bottom portion is 100 µm, at a maximum. From this, it is preferable that the overall length of the outer boundary of the bottom portion of the projecting body is in the range of from 30 µm to 630 µm. Thus, by giving these surface constructions to the excitation light incident surface of the luminescent material layer 421, the utilization efficiency of excitation light and luminescent light can be increased.

Further, the luminescent plate 400 of this embodiment may only have to have a construction in which luminescent light is emitted from the excitation light incident surface of the luminescent material layer 421, and hence, the invention is not limited to the construction shown in FIG. 1 in which the two types of luminescent light emitting areas 411, 413 and the diffuse transmission area 415 are arranged end to end in the circumferential direction.

Figure 8:
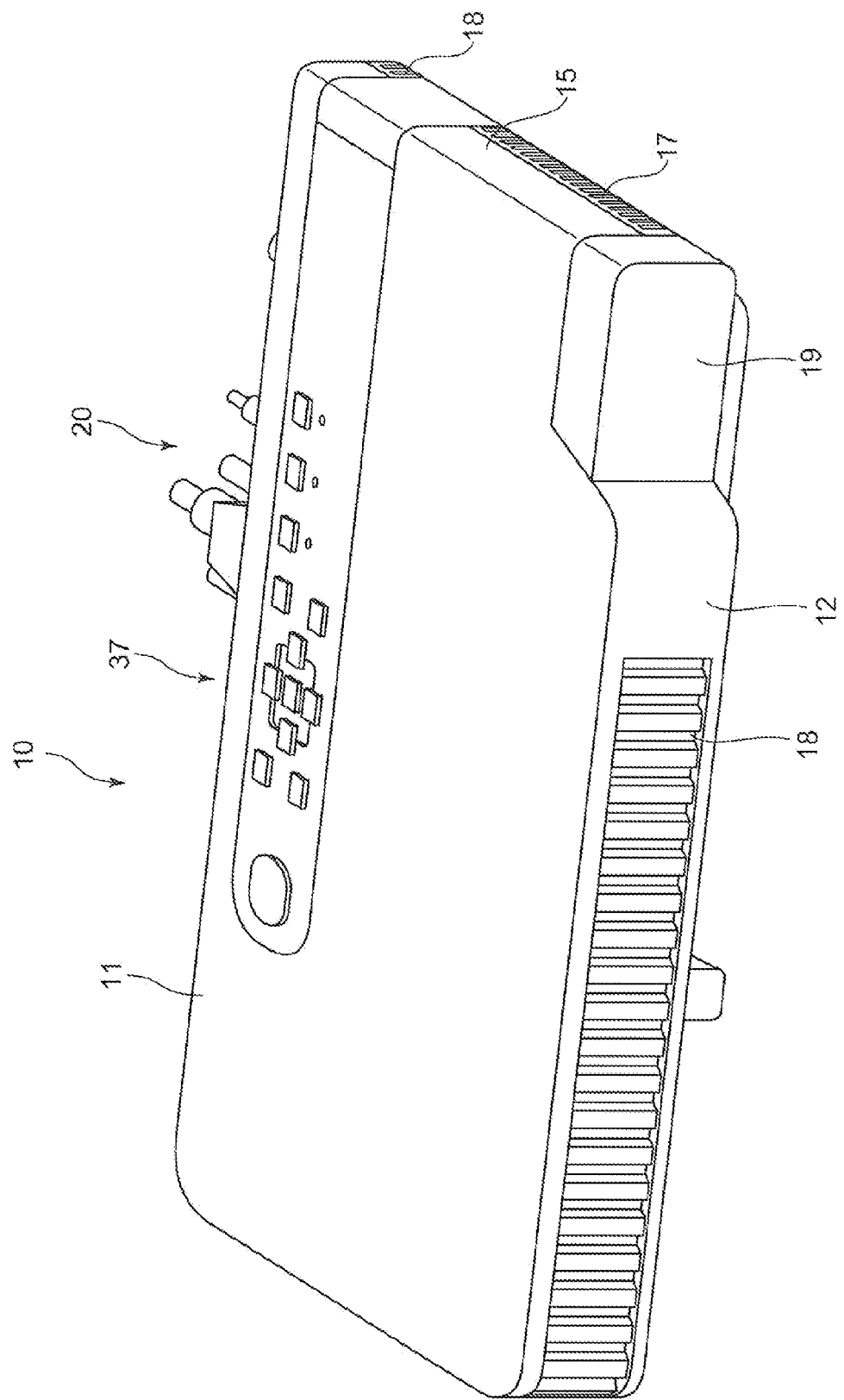
FIG. 8 is a perspective view showing an external appearance of a projector according to the embodiment of the invention.

Next, a projector will be described as electronic equipment including the luminescent plate 400 that has been described above. FIG. 8 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 8, the projector 10 has a substantially rectangular parallelepiped shape and has a lens cover 19 which covers a projection port which is laid to a side of a front panel 12 which is referred to as a front side panel of a projector housing, as well as a plurality of outside air inlet ports 18 which are formed in the front panel 12. Further, although not shown, the projector 10 includes an Ir reception unit for receiving a control signal from a remote controller.

In addition, a keys/indicators unit 37 is provided on an upper side panel 11 of the housing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display device, a control circuit or the like overheats.

Further, provided on a back side or a back side panel of the housing are an input/output connector unit where USB terminals, an image signal input D-SUB terminal, an S terminal, an RCA terminal and the like are provided and various types of terminals 20 including a power supply adaptor plug and the like. A plurality of outside air inlet ports 18 are formed in the back side panel. Pluralities of inside air outlet ports 17 are formed in a right-hand side panel which is a right-hand side panel, not shown, of the housing and a left-hand side panel 15 which constitute a side panel shown in FIG. 8. In addition, outside air inlet ports 18 are also formed in a corner portion between the left-hand side panel 15 and the back side panel.

Figure 9:
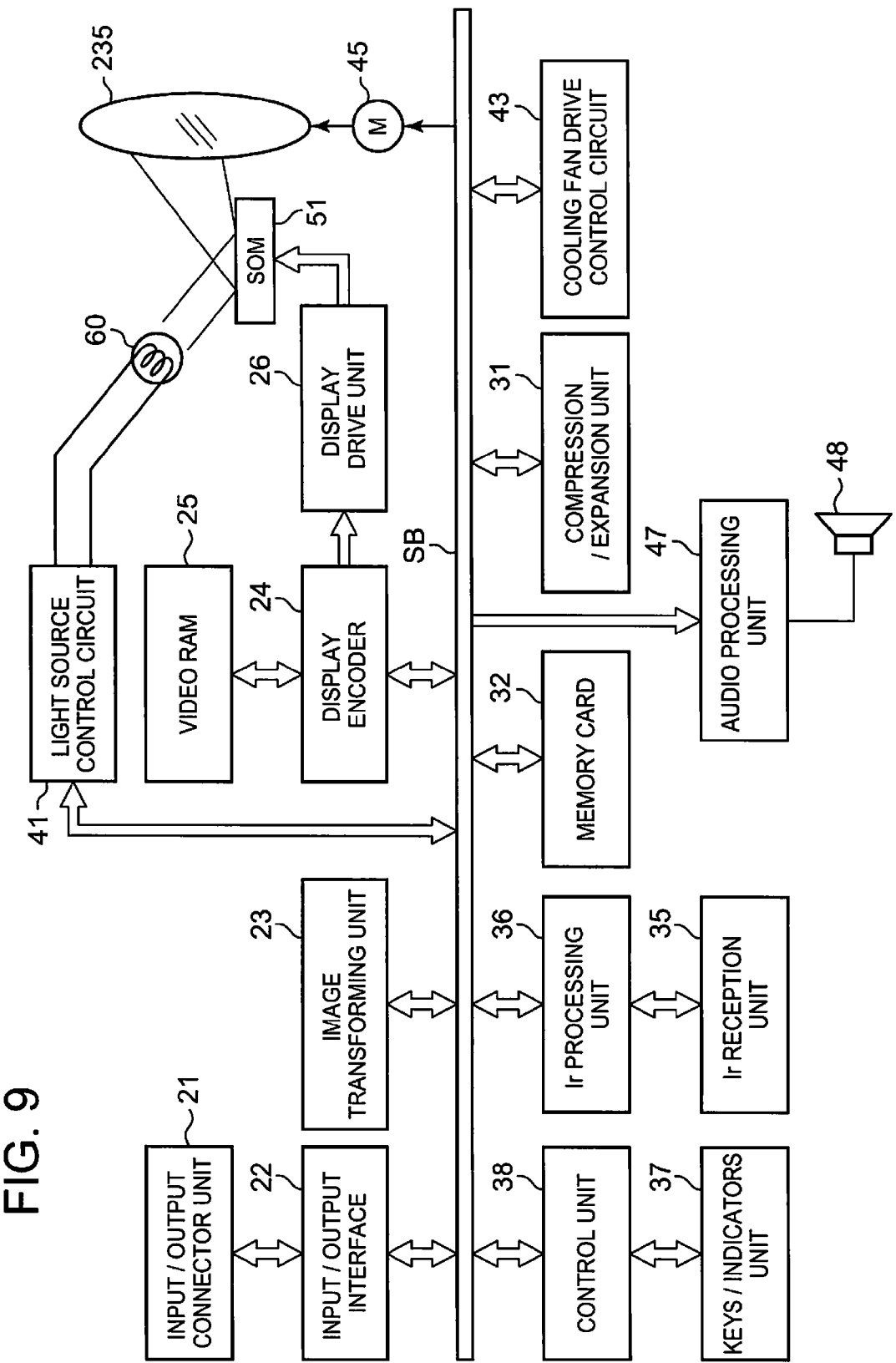
FIG. 9 is a functional block diagram of the projector.

Next, a projector control unit of the projector 10 will be described by use of a functional block diagram in FIG. 9. The projector control unit includes a control unit 38, an input/output interface 22, an image transforming unit 23, a display encoder 24, a display drive unit 26 and the like. The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

In addition, the display encoder 24 deploys the image signals that have entered thereinto on a video RAM 25 for storage therein and generates a video signal from the contents stored in the video RAM 25, outputting the video signal so generated to the display drive unit 26.

The display drive unit 26 functions as a display device controller and drives a display device 51 which is a spatial optical modulator (SOM) at an appropriate frame rate in response to the image signal outputted from the display encoder 24. In this projector 10, a pencil of light which is emitted from a light source unit 60 is shone onto the display device 51 to thereby form an optical image based on reflected light reflected at the display device 51. The image so formed is then projected on to a screen, not shown, for display via a projection-side optical system, which will be described later. A movable lens group 235 of the projection-side optical system is driven by a lens motor 45 for zooming or focusing.

In addition, an image compression/expansion unit 31 performs a recording operation in which a luminance signal and a color difference signal of an image signal are data compressed through ADCT and Huffman coding and the compressed data is sequentially written on a memory card 32 which is configured as a detachable recording medium. Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the housing are sent out directly to the control unit 38, while key operation signals generated by operating keys on the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a sound source circuit such as a PCM sound source. When in a projection mode and a reproducing mode, the audio processing unit 47 converts audio data into analog signals and drives a speaker 48 to output loudly sound or audio based on the audio data.

Additionally, the control unit 38 controls a light source control circuit 41 which is configured as a light source control unit. This light source control circuit 41 controls individually the emission of light from an excitation light shining device and a red light source device of the light source unit 60 so that light of a predetermined wavelength band which is required when images are reproduced is emitted from the light source unit 60.

Further, the control unit 38 causes a cooling fan drive control circuit 43 to detect temperatures through a plurality of temperature sensors which are provided in the light source unit 60 so as to control the rotating speed of a cooling fan based on the results of the temperature detection. In addition, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 10:
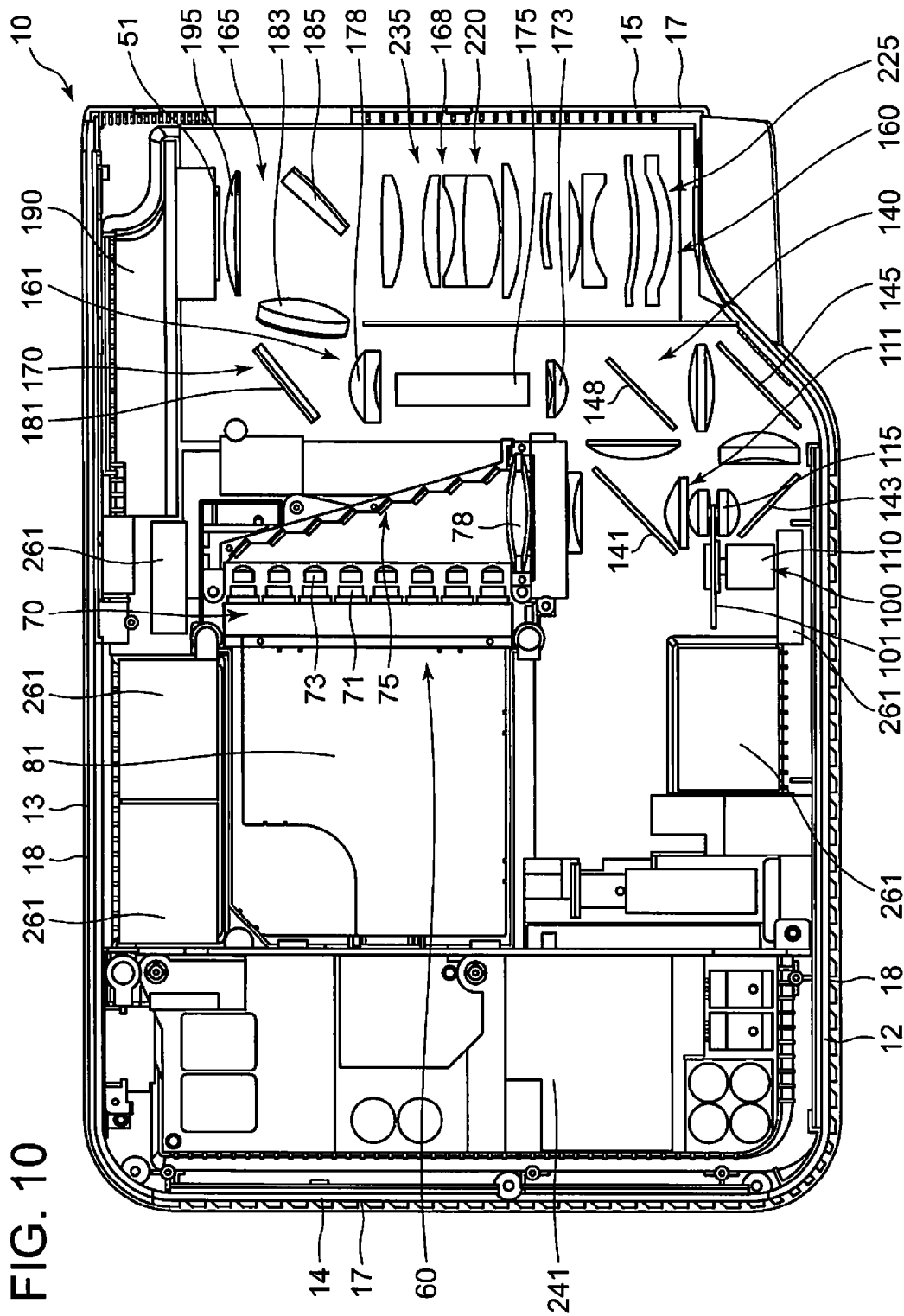
FIG. 10 is an exemplary plan view showing an internal construction of the projector.

Next, an internal construction of the projector 10 will be described. FIG. 10 is an exemplary plan view showing an internal construction of the projector 10. As is shown in FIG. 10, the projector 10 includes a control circuit board 241 which is disposed in proximity to the right-hand side panel 14. This control circuit board 241 includes a power supply circuit block or a light source control block. In addition, the projector 10 includes the light source unit 60 which is provided to a side of the power supply circuit block 241, that is, at a substantially central portion of the projector housing.

Further, the projector 10 includes an optical system unit 160 which is disposed between the light source unit 60 and the left-hand side panel 15. In addition, although not shown, a main control circuit board which includes a CPU or the like is disposed above the light source unit and the optical system unit 160, that is, between the light source unit 60 and the optical system unit 160 and the upper side panel 11.

The light source unit 60 includes the excitation light shining device 70 which is disposed at a substantially central portion of the projector housing with respect to a left-to-right direction which lies in proximity to the back panel 13, a luminescent light emitting device 100 which is disposed on an optical axis of a pencil of light emitted from the excitation light shining device 70 and in proximity to the front panel 12, and a light-guiding optical system 140 which changes optical axes of light rays emitted from the luminescent light emitting device 100 so as to converge to the same optical axis.

The excitation light shining device 70 includes an excitation light source 71 which is disposed so that an optical axis thereof becomes parallel to the back panel 13, a reflecting mirror group 75 which changes the optical axis of light emitted from the excitation light source 71 through 90 degrees so as to be oriented towards the direction of the front panel 12, a collective lens 78 for collecting the light emitted from the excitation light source 71 and reflected on the reflecting mirror group 75 and a heat sink 81 which is disposed between the excitation light source 71 and the right-hand side panel 14.

The excitation light source 71 includes a plurality of blue laser emitters which are arranged into a matrix configuration, and collimator lenses 73 are disposed individually on optical axes of the blue laser emitters so as to convert light emitted from the respective blue laser emitters into parallel light. In the reflecting mirror group 75, a plurality of reflecting mirrors are arranged in a step-like fashion so as to emit pencils of light emitted from the excitation light source 71 towards the collective lens 78 while reducing sectional areas of the pencils of light so emitted in one direction.

A cooling fan 261 is disposed between the heat sink 81 and the back panel 13, and the excitation light source 71 is cooled by the cooling fan 261 and the heat sink 81. Further, a cooling fan 261 is also disposed between the reflecting mirror group 75 and the back panel 13, and the reflecting mirror group 75 and the collective lens 78 are cooled by the cooling fan 261.

The luminescent light emitting device 100 includes a luminescent wheel 101 which is the luminescent plate 400 and which is disposed so as to be parallel to the front panel 12, that is, so as to be at right angles to the optical axis of light emitted from the excitation light shining device 70, a wheel motor 110 which drives the luminescent wheel 101 to rotate, a collective lens group 111 which collects pencils of light emitted from the luminescent wheel 101 in the direction of the back panel 13, and a collective lens 115 which collects pencils of light emitted from the luminescent wheel 101 in the direction of the front panel 12.

Then, light emitted from the excitation light shining device 70 and shone onto the red luminescent material layer 421R and the green luminescent material layer 421G of the luminescent wheel 101 excites respective luminescent materials, and pencils of luminescent light which are emitted by luminescence in every direction from the luminescent materials are emitted directly towards the back side panel 13 or are reflected on the surface of the luminescent wheel 101 to thereafter be emitted towards the back side panel 13 and are then incident on the collective lens group 111. In addition, light emitted from the excitation light shining device 70 and shone on to the diffuse transmission plate 417 of the luminescent wheel 101 is incident on the collective lens 115 as diffuse transmission light of blue wavelength band which is diffused by the minute irregularities. A cooling fan 261 is disposed between the wheel motor 110 and the front side panel 12, and the luminescent wheel 101 is cooled by this cooling fan 261.

The light-guiding optical system 140 includes a collective lens which collects pencils of light of red, green and blue wavelength bands, and reflecting mirrors or dichroic mirrors which change optical axes of the pencils of light of the respective wavelength bands so that the pencils of light converge to the same optical axis. Specifically, a primary dichroic mirror 141 is disposed between the excitation light shining device 70 and the luminescent wheel 101 which transmits light of blue wavelength band and reflects light of red and green wavelength bands so that optical axes of the red light and the green light are changed through 90 degrees towards the left-hand side panel 15.

In addition, a primary reflecting mirror 143 is disposed on the optical axis of light of blue wavelength band which diffuses and transmits through the luminescent wheel 101, that is, between the collective lens 115 and the front side panel 12. This primary reflecting mirror 143 reflects light of blue wavelength band so that an optical axis of the blue light is changed through 90 degrees in the direction of the left-hand side panel 15. Further, a secondary reflecting mirror 145 is disposed on the optical axis of light of blue wavelength band which is reflected on the first reflecting mirror 143 and in proximity to the optical system unit 160, and this secondary reflecting mirror 145 changes the optical axis of blue light through 90 degrees towards the back side panel 13. Additionally, a secondary dichroic mirror 148 is disposed in a position where the optical axes of light of red wavelength band and light of green wavelength band which are reflected by the primary dichroic mirror 141 intersect the optical axis of light of blue wavelength band which is reflected by the secondary reflecting mirror 145. This secondary dichroic mirror 148 transmits light of blue wavelength band and reflects light of red wavelength band and light of green wavelength band so as to change the optical axes of the light of red wavelength band and the light of green wavelength band through 90 degrees in the direction of the back panel 13. A collective lens is disposed between the respective dichroic mirrors and between the respective reflecting mirrors. Further, a collective lens 173 is disposed in proximity to an incident surface of a light tunnel 175 for collecting light source light to an incident opening of the light tunnel 175.

The optical system unit 160 has a substantially U-shape and includes three blocks such as an illumination-side block 161 which is positioned to a left-hand side of the excitation light shining device 70, an image generation block 165 which is positioned in proximity to a position where the back panel 13 and the left-hand side panel 15 intersect each other, and a projection-side block 168 which is positioned between the light-guiding optical system 140 and the left-hand side panel 15.

The illumination-side block 161 includes part of a light source side optical system 170 which guides light source light emitted from the light source unit 60 to the display device 51 which is included in the image generation block 165. As the light source side optical system 170 that is included in the illumination-side block 161, there are included the light tunnel 175 which converts a pencil of light emitted from the light source unit 60 into a pencil of light whose intensity distribution is uniform, the collective lens 178 which collects light emitted from the light tunnel 175, and an optical axis changing mirror 181 which changes optical axes of pencils of light emitted from the light tunnel 175 in the direction of the image generation block 165.

The image generating block 165 has, as the light source side optical system 170, a collective lens 183 which collects light source light which is reflected by the optical axis changing mirror 181 to the display device 51 and a shining mirror 185 which shines a pencil of light which has passed through the collective lens 183 onto the display device 51 at a predetermined angle. Further, the image generation block 165 includes a DMD which is the display device 51. A heat sink 190 is disposed between the display device 51 and the back panel 13 for cooling the display device 51. Thus, the display device 51 is cooled by this heat sink 190. A condenser lens 195, which functions as a projection-side optical system 220, is disposed in proximity to a front of the display device 51.

The projection-side block 168 has a lens group of the projection-side optical system 220 which projects on-light reflected by the display device 51 onto the screen. The projection-side optical system 220 is configured as a variable focus lens including a fixed lens group 225 which is incorporated in a fixed lens barrel and a movable lens group 235 which is incorporated in a movable lens barrel, whereby the variable focus lens enables zooming and focusing operations by moving the movable lens group 235 by a lens motor.

In this way, by using the luminescent wheel 400, as is described above, in the light source unit 60 of the projector 10, a highly luminous projection is enabled. In addition, since the output of the excitation light source 71 does not have to be increased, the configuration according to this embodiment contributes to the reduction in size and thickness of the projector 10. In the embodiment described heretofore, while the configuration is adopted in which the luminescent wheel 101 is used on which the red and green luminescent light emitting areas and the diffuse transmission area are aligned end to end in the circumferential direction, so that luminescent light of red wavelength band, luminescent light of green wavelength band and diffuse transmission light of blue wavelength band are generated by shining light emitted from the excitation light shining device 70 on to the luminescent wheel 101, the invention is not limited to that construction.

Figure 11:
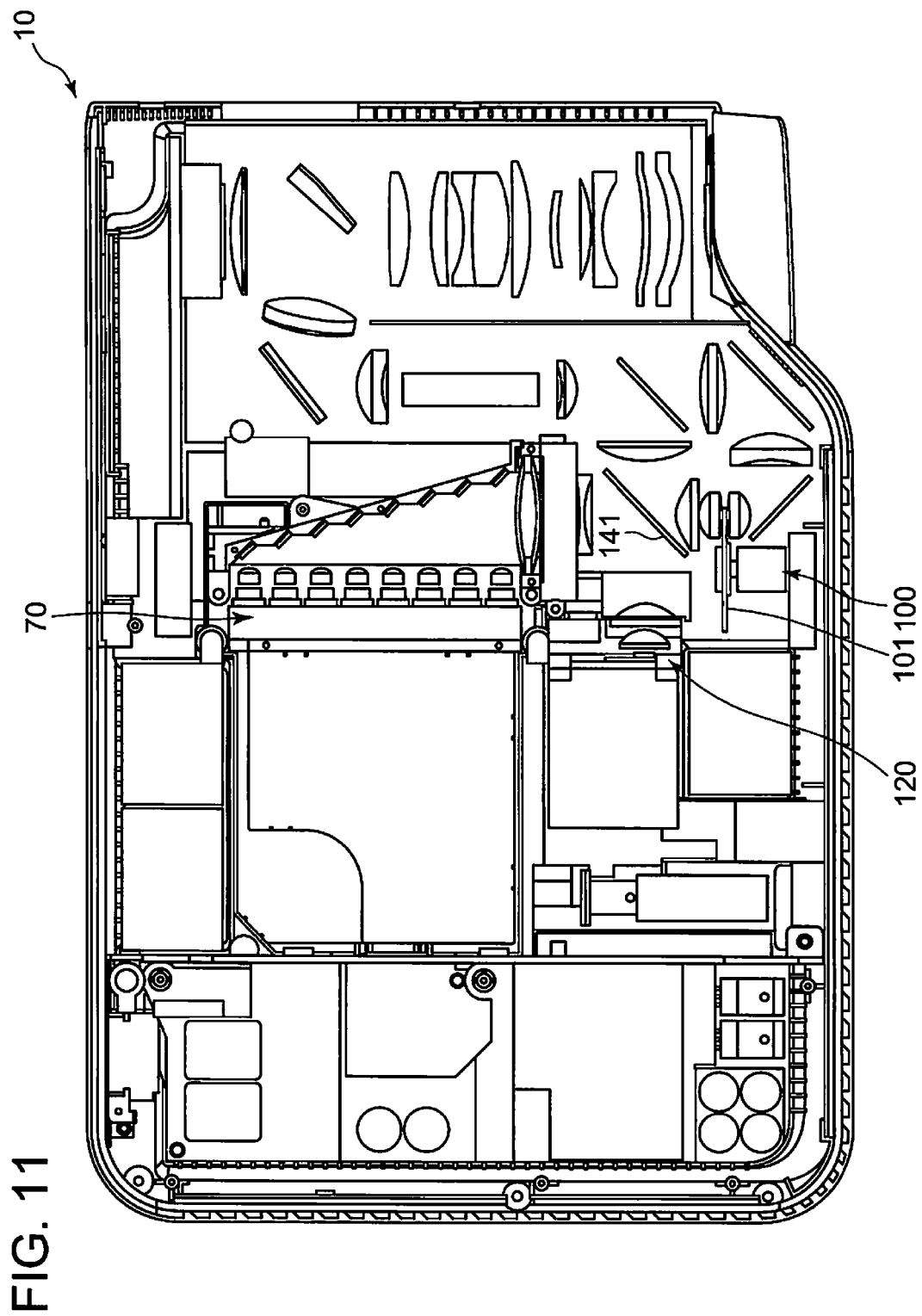
FIG. 11 is an exemplary plan view showing an internal construction of a projector according another embodiment of the invention.

Namely, a luminescent wheel 101 is provided in which a green luminescent light area and a diffuse transmission area are aligned end to end in a circumferential direction. Then, as to light of red wavelength band, a configuration shown in FIG. 11 may be adopted in which a red light source device 120 is provided separately so that light emitted from this red light source device 120 is used as light of red wavelength band. As this occurs, a first dichroic mirror 140 is necessary which transmits light of red and blue wavelength bands and reflects light of green wavelength band. Even in the event that this configuration is adopted, by forming irregularities on an excitation light incident surface of the green luminescent material layer by arranging a plurality of projecting bodies thereon, the luminous efficiency can be increased, thereby making it possible to provide a projector 10 which enables the highly luminous projection.

Figure 12:
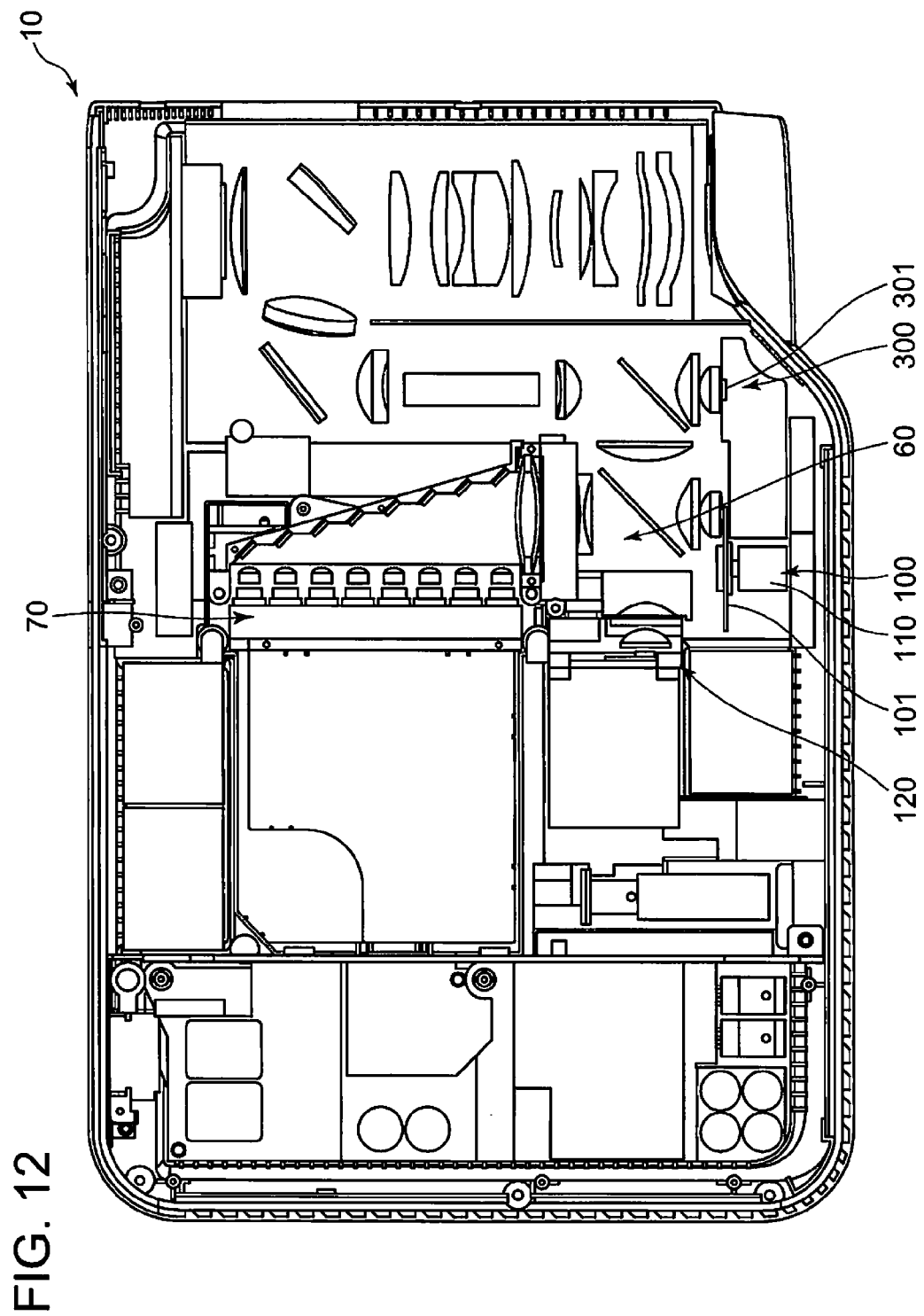
FIG. 12 is an exemplary plan view showing an internal construction of a projector according to a further embodiment of the invention.

In addition, a configuration shown in FIG. 12 can also be adopted. Namely, only a green luminescent light emitting area is provided on a luminescent wheel 101. A blue light source device 300 which includes a blue light source 301 made up of a blue light emitting diode is provided separately. Then, luminescent light from the luminescent wheel 101 is used for light source light of green wavelength band, and light emitted from the blue light source device 300 is used for light source light of blue wavelength band. In a projector 10 which adopts this configuration, too, the luminous efficiency can be increased by forming irregularities on an excitation light incident surface of the green luminescent material layer by arranging a plurality of projecting bodies thereon, thereby making it possible to provide the projector 10 which enables the highly luminous projection.

Further, a configuration may be adopted in which a red luminescent light emitting area which includes a red luminescent material layer, a green luminescent light emitting area which includes a green luminescent material layer and a blue luminescent light emitting area which includes a blue luminescent material layer are provided end to end in a circumferential direction on a luminescent wheel 101 and an ultraviolet laser emitter is used as an excitation light source. Even in the event that this configuration is adopted, by forming irregularities like those described above on a surface of each of the luminescent material layers, the utilization efficiency of excitation light and luminescent light can be increased.

The invention is not limited to the embodiment and the modified examples thereof but can be modified or improved freely without departing from the spirit and scope of the invention. In addition, as many of the functions that are executed in the embodiment as possible may be combined together as required for execution of the invention. Various stages are included in the embodiment described above, and various inventions can be extracted by combining a plurality of constituent requirements disclosed therein as required. For example, even when some of the whole constituent requirements disclosed in the embodiment are deleted, a resulting configuration from which those constituent requirements are deleted can be extracted as an invention.

What is claimed is:
1. A light source unit comprising:
   a luminescent plate comprising a luminescent material layer which emits light of a predetermined wavelength band when excitation light is incident thereon, wherein the luminescent plate is adapted to emit luminescent light from an excitation light incident surface of the luminescent material layer; and
   an excitation light source for shining the excitation light on to the luminescent plate,
   wherein the excitation light incident surface of the luminescent material layer has a surface construction in which a plurality of surface irregularities are formed thereon,
   wherein the surface irregularities comprise a plurality of projecting bodies formed of the luminescent material layer itself.
2. A light source unit as set forth in claim 1, wherein in the surface construction, each of the plurality of projecting bodies have a sectional area which decreases from a bottom surface to an apex and are arranged at equal intervals on a flat surface so that parts of adjacent projecting bodies are in contact with each other.

3. A light source unit as set forth in claim 2, wherein a rising angle of each projecting body with respect to a surface of the luminescent plate is not less than 30 degrees.

4. A light source unit as set forth in claim 2, wherein an apex portion of each projecting body is a sharp shape.

5. A light source unit as set forth in claim 2, wherein each projecting body is a quadrangular pyramid.

6. A light source unit as set forth in claim 5, wherein a length of one side of an outer boundary of a bottom portion of the quadrangular pyramid is in a range from 10 to 100 µm.

7. A light source unit as set forth in claim 2, wherein each projecting body is a spherical body.

8. A light source unit as set forth in claim 7, wherein a length of one side of a square which touches internally an outer circumference of a circular bottom portion of each projecting body is in a range from 10 to 100 µm.

9. A light source unit as set forth in claim 7, wherein part of each projecting body is cut so that a bottom portion is formed into a hexagon, and a length of one side of the hexagon is in a range from 10 to 100 µm.

10. A light source unit as set forth in claim 7, wherein part of the projecting body is cut so that a bottom portion is formed into a square, and a length of one side of the square is in a range from 10 to 100 µm.

11. A light source unit as set forth in claim 2, wherein each projecting body is an aspherical body.

12. A light source unit as set forth in claim 11, wherein a length of one side of a square which touches internally an outer circumference of a circular bottom portion of each projecting body is in a range from 10 to 100 µm.

13. A light source unit as set forth in claim 11, wherein part of each projecting body is cut so that a bottom portion is formed into a hexagon, and a length of one side of the hexagon is in a range from 10 to 100 µm.

14. A light source unit as set forth in claim 11, wherein part of each projecting body is cut so that a bottom portion is formed into a square, and a length of one side of the square is in the range from 10 to 100 µm.

15. A light source unit as set forth in claim 1, wherein a plurality of segments are formed on the luminescent plate which emit light of different wavelength bands when receiving the excitation light, and wherein at least one of the plurality of segments is made into a luminescent light emitting area on which the luminescent material layer is laid.

16. A light source unit as set forth in claim 15, wherein the excitation light source is a light source which emits light of a blue wavelength band, and wherein a diffuse transmission area is formed in the luminescent plate which diffuses and transmits light emitted from the excitation light source.

17. A light source unit as set forth in claim 16, wherein the luminescent plate comprises a luminescent wheel on which the luminescent light emitting area and the diffuse transmission area are aligned end to end in a circumferential direction.

18. A light source unit as set forth in claim 17,
the luminescent light emitting area comprises a red luminescent light emitting area which includes a red luminescent material layer which emits light of a red wavelength band when receiving light emitted from the excitation light source, and a green luminescent light emitting area which includes a green luminescent material layer which emits light of a green wavelength band when receiving light emitted from the excitation light source,
wherein the luminescent wheel comprises the diffuse transmission area, the red luminescent light emitting area, and the green luminescent light emitting area, and
wherein the diffuse transmission area, the red luminescent light emitting area and the green luminescent light emitting area area aligned end to end in the circumferential direction.

19. A light source unit as set forth in claim 17,
wherein the luminescent light emitting area comprises a green luminescent light emitting area which includes a green luminescent material layer which emits light of green wavelength band when receiving light emitted from the excitation light source;
wherein the luminescent wheel comprises the diffuse transmission area and the green luminescent light emitting area;
wherein the diffuse transmission area and the green luminescent light emitting area are aligned end to end in the circumferential direction; and
wherein the light source unit further comprises a red light source which emits light of a red wavelength band.

20. A projector comprising:
the light source unit set forth in claim 15;
a display device;
a light source side optical system which emits light emitted from the light source unit to the display device;
a projection side optical system which emits projection light produced at the display device towards a screen; and
a projector control unit for controlling the light source unit and the display device.

* * * * *

UNITED STATES PATENT AND TRADEMARK OFFICE
CERTIFICATE OF CORRECTION

Page 1 of 1

PATENT NO.        : 8,746,896 B2
APPLICATION NO.   : 13/237048
DATED             : June 10, 2014
INVENTOR(S)       : Naotsugu Ogura et al.

It is certified that error appears in the above-identified patent and that said Letters Patent is hereby corrected as shown below:

In the Claims

Column 16, claim 18, line 23, change "area aligned" to --are aligned--.

Signed and Sealed this
Twenty-third Day of December, 2014

Michelle K. Lee
*Deputy Director of the United States Patent and Trademark Office*